United States Patent
Fusco et al.

(10) Patent No.: US 6,274,529 B1
(45) Date of Patent: *Aug. 14, 2001

(54) CATALYTIC SYSTEM FOR THE (CO)POLYMERIZATION OF ALPHA-OLEFINS

(75) Inventors: Roberto Fusco; Luca Longo; Antonio Proto, all of Novara; Diego Vigliarolo, Rho; Gianfranco Guglielmetti, Bogogno; Liliana Gila, Cameriano, all of (IT)

(73) Assignee: Enichem S.p.A., Milan (IT)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/736,063

(22) Filed: Oct. 22, 1996

(30) Foreign Application Priority Data

Oct. 27, 1995 (IT) .............................. MI95A02214

(51) Int. Cl.⁷ .............................. B01J 31/22; C08F 4/603
(52) U.S. Cl. .......................... 502/126; 502/104; 502/118; 502/120; 502/121; 502/122; 502/123; 502/128; 502/152; 502/155; 526/943
(58) Field of Search ..................................... 502/104, 118, 502/120, 121, 122, 123, 126, 128, 152, 155; 526/943

(56) References Cited

U.S. PATENT DOCUMENTS

| | | | | |
|---|---|---|---|---|
| 5,153,157 | * | 10/1992 | Hlatky et al. | 502/117 |
| 5,556,821 | * | 9/1996 | Aida et al. | 502/113 |

FOREIGN PATENT DOCUMENTS

| | | |
|---|---|---|
| 0 520 732 | 12/1992 | (EP) . |
| 0 644 206 | 3/1995 | (EP) . |
| 0 648 786 | 4/1995 | (EP) . |

OTHER PUBLICATIONS

"Synthesis and Application of Chiral Cyclopentadienylmetal Complexes", Ronald L. Halterman, Chem. Rev. 1992, 92, pp. 965–994.*

* cited by examiner

Primary Examiner—David W. Wu
Assistant Examiner—Caixia Lu
(74) Attorney, Agent, or Firm—Oblon, Spivak, McClelland, Maier & Neustadt, P.C.

(57) ABSTRACT

A catalytic system with an increased activity for the (co) polymerization of alpha-olefins comprises a catalyst of the metallocene type, which is capable of polymerizing olefins without aluminoxane, and a weak coordinating compound, which, when used in a polymerization process, enables a higher productivity than an analogous process carried out with the metallocene type catalyst per se.

22 Claims, No Drawings

CATALYTIC SYSTEM FOR THE (CO)POLYMERIZATION OF ALPHA-OLEFINS

The present invention relates to an activated catalytic system for the (co)polymerization of alpha-olefins.

More specifically, the present invention relates to a catalytic system comprising a metallocene complex of a transition metal, active in homo- and co-polymerization processes of alpha-olefins, and particularly ethylene.

It is generally known in the art that alpha-olefins can be polymerized by means of low, medium or high pressure processes with catalysts based on a transition metal, generally known as Ziegler-Natta type catalysts.

A particular group of these catalysts, generally having very high polymerization activities, consists of the combination of an organo-oxygenated derivative of aluminium (commonly called aluminoxane) with a $\eta^5$-cyclopentadienyl derivative of a transition metal, also commonly called metallocene, which can be defined in its most general form with the following formula (I):

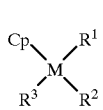

(I)

wherein M represents a metal of group 4 of the periodical table of elements, formally in the oxidation state of +4, and is preferably titanium or zirconium; $R^1$ and $R^2$ each independently represent a group having an anionic nature such as, for example, a hydride, a halide, a phosphonated or sulfonated anion, an alkyl or alkoxy group, an aryl or aryloxy group, an amide group, a silyl group, etc; Cp independently represents a ligand of the $\eta^5$-cyclopentadienyl type and is generally selected from $\eta^5$-cyclopentadienyl, $\eta^5$-indenyl, $\eta^5$-fluorenyl and their variously substituted derivatives; $R^3$ can, independently of the nature of the other substitutes, have one of the definitions of the ligand Cp, or $R^1$ or $R^2$ groups. "Bridged" metallocenes are also of particular interest in the known art, wherein the Cp and $R_3$ groups, the same or different, are linked by a covalent bridge which normally also comprises other carbon atoms or heteroatoms. For a known technique for the preparation of the above compounds, reference should be made, as an example, to the publication of H. Sinn, W. Kaminsky, in Adv. Organomet. Chem., vol. 18 (1980), page 99 and U.S. Pat. No. 4.542.199.

Catalytic systems based on metallocenes normally allow high polymerization activities to be reached in the presence of an aluminoxane in great molar excess with respect to the metal M, with an atomic ratio Al/M usually between 500 and 5000. This creates the presence of a relatively high quantity of aluminium in the polyolefins thus obtained, consequently making them unsuitable for numerous applications in which the presence of metal ions is not tolerable, such as, for example, when insulating properties or food compatibility are required.

In addition, aluminoxanes and particularly methylalumoxane which is the activator normally used, necessitate relatively complicated synthetic methods and conservation which make their use in various applications inconvenient with respect to the less costly traditional catalytic systems based on titanium or vanadium chlorides and aluminiumalkyls.

More recently catalysts of the metallocene type have been developed, which are capable of polymerizing olefins also without aluminium compounds and particularly aluminoxanes. These systems are commonly based on the formation of a catalytic species of a cationic nature, obtained by the contact of a suitable metallocene with strong Lewis acids. Various cationic systems of this type are described for example, in the publications of R. R. Jordan in "Advances in Organometallic Chemistry", vol. 32 (1990), pages 325–387, and X. Yang et al. in "Journal of the American Chemical Society", vol. 116 (1994), page 10015, which provide, as well as a detailed description of the field, numerous patent references on the subject.

The activity of cationic metallocene catalytic systems is generally lower, however, than the high activity of systems using methylalumoxane in prejudice of a wider diffusion of the former.

A small increase in the activity of catalysts comprising metallocenes of transition metals, particularly Ti and Zr, has been observed in oligo- and poly-merization processes of alpha-olefins carried out in polar solvents. F. S. Duiachkovskii et al, in "Journal of Polymer Science, Part C", vol. 16 (1967) pages 1333–1339, describes an increase in the oligomerization constant of 1-decene in the presence of a catalytic system obtained by the combination of cyclopentadienyltitanium methylchloride with aluminiummethyldichloride, when the solvent medium varies from benzene to dichloroethane. The same reference also describes a polymerization experiment of ethylene in dichloroethane using the same catalytic system in the presence of an electric field. In each case the productivities observed were low. A polymerization process of olefins carried out in a solvent such as dichloroethane is also industrially unrealistic owing to the great purification difficulties of the polymer obtained with this process and for the high operating costs of the process itself German patent 4.426.122 (Nippon Oil) discloses the use of an organic compound containing at least one fluorine-carbon bond to increase the activity of a catalytic system comprising a metallocene of a metal of group 4 of the periodic table and methylaluminoxane (MAO). Also in this case, however, a relatively small increase in activity is observed, which is obtained, in addition, in the presence of MAO, with the relative disadvantages mentioned above.

European patent application pub. No. 648,786 relates to a polymerization catalyst comprising an ionic metallocene and a Lewis base. Although increased polymerization activities are shown at high temperature with diisobutylphthalate, the strong Lewis bases disclosed in this reference are known to have a poisoning effect on olefin polymerization catalyst which make their use unsuitable for many processes at low to medium temperature.

The demand for metallocene catalysts with a high activity excluding the use of aluminoxanes as activators therefore remains unanswered.

The Applicant has now surprisingly found that the activity of metallocene catalysts not comprising aluminoxanes is considerably increased in the presence of particular organic substances not containing metals.

A first object of the present invention therefore relates to an improved catalyst for the (co)polymerization of alpha-olefins comprising the following components in contact with each other:

(A) a metallocene derivative of a metal selected from the group consisting of transition metals and lanthanides, capable in itself of promoting the polymerization of olefins without organo-oxygenated compounds of metals of groups 13 or 14 of the periodic table of elements, (B) a substance not containing metal atoms, characterized in that this substance (B) consists of an aprotic polar compound having a weak co-ordinating capacity.

A second object of the present invention relates to an improved process for the (co)polymerization of alpha-olefins characterized in that it is carried out in the presence of the above improved catalyst.

The term "(co)polymerization of alpha-olefins" as used hereafter in the text and claims refers both to the homopolymerization and copolymerization of alpha-olefins with each other or with another ethylenically unsaturated polymerizable compound.

The metallocene derivative (A) of the present invention is an organometallic compound of a transition metal or lanthanide, preferably a metal selected from Ti, Zr and Hf, characterized by the presence of at least one $\eta^5$-cyclopentadienyl group co-ordinated to the metal, and by the capacity of promoting the polymerization of alpha-olefins also without an organo-oxygenated compound of a metal of groups 13 or 14 of the periodic table. These organo-oxygenated compounds are monomeric or polymeric organometallic derivatives containing at least one oxygen atom linked to a metal of group 13 or 14 of the periodic table, such as, for example, aluminoxanes, especially methylaluminoxane, galloxanes or stannoxanes, which are widely used as co-catalysts of many catalytic systems based on metallocenes.

The elements silicon and carbon, belonging to group 14 of the periodic table of elements are not considered metals for the purposes of the present invention. In accordance with the present invention the term "transition metals" refers to metals of groups 3 to 10 of the periodic table, whereas "lanthanides" are metals having an atomic number of between 57 and 71.

Metallocene derivatives (A) of the type defined above are known and have been widely described in literature. They usually consist of an ionic (anion-cation) system in which the cation comprises the metallocene. These metallocene derivatives (A) can be obtained by different methods described in literature, generally by the reaction of a metallocene with a compound capable of extracting a group sigma-bonded to the metal with the formation of a cationic species. Metallocenes which are suitable for the formation of these ionic metallocene derivatives are those having the following general formula (II):

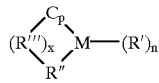

(II)

wherein:

M represents a metal selected from metals of groups 3 to 5, or from the group of lanthanides in the periodic table of elements;

$C_p$ is an anion containing a $\eta^5$-cyclopentadienyl ring co-ordinated to the metal M, each of the n R' independently represent a substituent group selected from hydride, halide, a $C_1$–$C_8$ alkyl group, a $C_3$–$C_{12}$ alkylsilyl group, a $C_5$–$C_8$ cycloalkyl group, a $C_6$–$C_{10}$ aryl group, a $C_1$–$C_8$ alkoxyl group, a $C_1$–$C_8$ carboxyl group, a $C_2$–$C_{10}$ dialkylamide group and a $C_4$–$C_{20}$ alkylsilylamide group;

R" represents a substituent group of the same nature as the previous R' groups, independently selected from these, or a second anion containing a $\eta^5$-cyclopentadienyl ring co-ordinated to the metal M;

R'" represents a divalent group having from 1 to 10 carbon atoms, optionally containing one or more heteroatoms, preferably O, N, P or Si, which is bridge-linked between $C_p$ and R" with a covalent bond. R'" is preferably selected from alkylene, dialkylsilylene, diarylsilylene, alkyl- or aryl amino or phosphino radicals, arylene, arylene-bis-alkylene etc.

"n" is an integer and is equal to the valence of M less 2;

"x" can be 0 or 1.

In the compounds having the above formula (II), when "x" is 0 the two groups R" and $C_p$ are not bridge-linked to each other. Typical non-limiting examples of R'" are methylene, 1,2-ethylene, dimethylsilylene groups.

The metal M in the compound having formula (II) is preferably selected from titanium, zirconium or hafnium in their oxidation state of +4. In this case "n" in formula (II) is preferably equal to 2.

According to the present invention, the R' groups of formula (II) can each independently represent a hydride or halide, such as chloride or bromide, a $C_1$–$C_8$ alkyl group such as, for example, methyl, ethyl, butyl, isopropyl, isoamyl, octyl, benzyl, a $C_3$–$C_{12}$ alkylsilyl group such as, for example, trimethylsilyl, triethylsilyl or tributylsilyl, a cycloalkyl group such as cyclopentyl or cyclohexyl, a $C_6$–$C_{10}$ aryl group such as phenyl or toluyl, a $C_1$–$C_8$ alkoxyl group such as, for example, methoxyl, ethoxyl, iso- or sec-butoxyl, or again, a $C_2$–$C_{10}$ dialkylamide or $C_4$–$C_{20}$ alkylsilylamide group, preferably of the type which can be represented with the general formula —$NR^4R^5$ wherein $R^4$ and $R^5$ are alkyl groups having from 1 to 4 carbon atoms, such as, for example, methyl, ethyl or butyl groups, or, in the case of alkylsilylamides, alkylsilyl having from 3 to 6 carbon atoms, such as, for example, trimethylsilyl or triethylsilyl. The R' groups, when "n" is equal to 2, can also be joined to each other with a covalent bond to form a cyclic structure comprising the metal M. (R')$_2$ groups of this latter type are, for example, 1,4-tetra-methylene, ethylenedioxide or malonate groups.

The R' groups (II) preferably represent a radical selected from chloride, methyl, benzyl and diethylamine.

In a particularly preferred form the R' groups are the same as each other.

According to the present invention, the $C_p$ group in formula (II) is an anion containing an $\eta^5$-cyclopentadienly ring which preferably derives (formally by the extraction of a $H^+$ ion) from a molecule of cyclopentadiene, indene or fluorene, or from a derivative of one of the above compounds, in which one or more carbon atoms of the molecular skeleton (included or not included in the cyclopentadienly ring) are substituted with $C_1$–$C_8$ alkyl or silylalkyl groups, or $C_6$–$C_{10}$ aryl or aryloxy groups or $C_1$–$C_8$ alkoxyl groups. This $C_p$ group can also be condensed with one or more other aromatic rings as in the case, for example, of 4,5-benzoindenyl. Typical but non-limiting examples of these $C_p$ groups are cyclopentadienyl, indenyl, 4,5,6,7-tetrahydroindenyl groups and the corresponding methyl-substituted groups.

As previously defined, R" in formula (II) can represent either a group included in the above definition of R' or, and preferably, a group included in the above definition of $C_p$. In this latter case R" can indifferently be a cyclopentadienyl anion the same as or different from $C_p$.

When "x"=1, the R" group is linked to the $C_p$ group by the bridge R'", in which case it evidently represents a group included in the definition of R' or $C_p$ respectively, but having a position substituted by the bond with the bridge R'".

Metallocenes having the above formula (II) are generally known in the art and can be prepared with one of the usual methods suitable for the case, described in synthesis handbooks of organometallic compounds, or in the vast patent literature relating to the use of metallocenes in the polymerization of olefins, which is generally used as reference.

As already mentioned, the metallocene derivatives (A) of the present invention can be obtained by extraction reactions of a group sigma-bonded to the metal M in a compound having the previous formula (II). These reactions are preferably carried out in an inert liquid medium, preferably hydrocarbon, and are normally carried out by putting a compound having formula (II) in contact with a suitable co-catalyst (C) capable of activating the formation of the cationic species.

Examples of these reactions are qualitatively summarized in the list below, which however does not limit the overall scope of the present invention:

i) by pre-reacting a metallocene having the above formula (II) with an alkylating agent, preferably an aluminium trialkyl, in a molar excess 5-50/1, followed by the reaction, in an almost stoichiometric ratio with the metal M, with a strong Lewis acid such as, for example tris(pentafluorophenyl)boron, or with an ionic compound whose cation is capable of extracting one of the groups R' or R" and forming a neutral compound, and whose anion is non-co-ordinating;

ii) by a reaction according to previous item i), without pre-reacting an alkylating agent, when at least one R' or R" group of the metallocene having the above formula (II), is alkyl or alkylene, iii) by the reaction of a metallocene having the above formula (II) with a molar excess, preferably 5–50/1 of an aluminium trialkyl or an alkylaluminium halide definible with the formula $AlR_mX_{3-m}$, wherein R is a $C_1$–$C_8$ alkyl group, linear or branched, or a mixture thereof, X is a halogen, preferably chlorine or bromine, and "m" is a decimal number comprised between 1 and 3.

Metallocene catalysts active in the polymerization of olefins without aluminoxane, which are suitable as component (A) of the catalyst of the present invention are described, for example, in the publications mentioned above relating to cationic metallocene derivatives of the known art, as well as in the following patent publications, whose contents are herein incorporated as reference:

European patent application published with the Nr.: EP-A 522.581, EP-A 495 375, EP-A 520732, EP-A 478913, EP-A 468651, EP-A 427697, EP-A 421659, EP-A 418044;

International patent applications published with the Nr.; WO 92/00333, WO 92/05208;

U.S. Pat. Nos. 5,064,802, 2,827,446, 5,066,739.

Non-limiting examples of metallocene derivatives (A) which can be used for the formation of the catalyst of the present invention are listed below in table 1, with reference to the respective precursors from whose combination they are obtained. Accordingly, each metallocene compound in the left column can be combined with each ionizing compound in the right column.

TABLE 1

| Metallocene | Co-catalyst (C) |
| --- | --- |
| $(\eta^5\text{-}C_5H_5)_2TiCl$ | $AlEtCl_2$ |
| $(\eta^5\text{-THInd})_2ZrCl_2$ | $AlR^6_3 + B(C_6F_5)_3$ |
| $(\eta^5\text{-}C_5H_5)_2ZrCl_2$ | $AlR^6_3 + [Ph_3C]^+.[B(C_6F_5)_4]^-$ |
| $[1,2\text{-en}(\eta^5\text{-Ind})_2]ZrCl_2$ | $AlR^6_3 + [Bu^n_3NH]^+.[B(C_6F_5)_4]^-$ |

TABLE 1-continued

| Metallocene | Co-catalyst (C) |
| --- | --- |
| $(\eta^5\text{-Ind})Zr(NMe_2)_3$ | $AlR^6_3 + [PhNMe_2H]^+.[B(C_6F_5)_4]^-$ |
| $[Ph_2Si(\eta^5\text{-Ind})_2]ZrCl_2$ | $AlR^6_3 + [Li]^+.[B(C_6F_5)_4]^-$ |
| $[Me_2Si(\eta^5\text{-Ind})_2]HfCl_2$ | $AlR^6_3 + [Li]^+.[Al(C_6F_5)_4]^-$ |
| $[Pr^i(\eta^5\text{-}C_5H_5)(\eta^5\text{-Flu})]ZrCl_2$ | $AlR^6_3 + [PhNMe_2H]^+.[B(C_6F_5)_4]^-$ |
| $[Me_2Si(\eta^5\text{-}C_5Me_4)(NBu^t)]TiCl_2$ | |
| $(\eta^5\text{-}C_5H_5)_2ZrCl(NMe_2)$ | |
| $(\eta^5\text{-}C_5Me_5)_2ZrMe_2$ | $[Ph_3C]^+.[B(C_6F_5)_4]^-$ |
| $(\eta^5\text{-}C_5H_5)_2TiClMe$ | $[Bu^n_3NH]^+.[B(C_6F_5)_4]^-$ |
| $[1,2\text{-en}(\eta^5\text{-THInd})_2]ZrMe_2$ | $[PhNMe_2H]^+.[B(C_6F_5)_4]^-$ |
| $[1,2\text{-en}(\eta^5\text{-Ind})_2]TiMe_2$ | $B(C_6F_5)_3$ |

Abbreviations:
Me = methyl, Et = ethyl, $Bu^t$ = tert-butyl, $Bu^i$ = iso-butyl, Bz = benzyl, $Pr^i$ = 2,2-isopropylidene, $Me_2Si$ = dimethylsilylene, Ind = indenyl, THInd = 4,5,6,7-tetrahydroindenyl, Flu = fluorenyl, 1,2-en = 1,2-ethylidene, $Ph_2Si$ = diphenylsilylene, $R^6$ = (methyl, ethyl or isobutyl).

Also included in the scope of the present invention are those components (A) consisting of or obtained by starting from a metallocene belonging to any one of the groups previously described, which is supported on an inorganic or polymeric organic solid inert medium, preferably selected from inert inorganic oxides, more preferably selected from alumina, silica and silicoaluminates. These supported complexes can be obtained by impregnating the carrier with a solution in an inert solvent of the metal complex, or they can be prepared with methods which comprise the formation of relatively stable chemical bonds between complex and carrier. Supported ionic metallocene derivatives active in the polymerization of olefins without aluminoxanes or other organo-oxygenated compounds of non-transition metals, and methods for their preparation, are described in literature, for example, in published European patent application Nr. EP-A 522.581 and in International patent application WO 91/09882.

Component (B) of the catalyst of the present invention consists of a weakly co-ordinating, aprotic polar compound. These compounds are characterized by a high polarity of the molecule and consequently by a high dielectric constant preferably equal to or higher than 3.0, more preferably equal to or higher than 4.0. They must also have a relatively low coordinating capacity.

In accordance with the present invention, the co-ordinating capacity of a chemical compound is defined as specified in the publication of V. Guttmann "Coordination Chemistry Review", vol. 18 (1976), pages 229–231, whose contents are included herein as reference. In particular, the coordinating capacity of a compound B (also called "donicity", DN) is defined by the equation:

$$DN_B = -H_{BSbC15}$$

wherein $H_{BSbC15}$ is the molar enthalpy expressed in kcal, measured by the interaction of B with $SbCl_5$ in a very dilute solution of dichloroethane.

A compound suitable for use as component (B) according to the present invention should preferably have a co-ordinating capacity DN equal to or less than 10 kcal/mole, more preferably equal to or less than 5.0 kcal/mole.

For the purposes of the present invention it is preferable that the contact between (A) and (B) gives rise only to reversible physical or chemical interactions.

Component (B) of the catalyst of the present invention preferably consists of a weakly co-ordinating polar compound or mixture of compounds, which contain carbon atoms and/or silicon, and one or more heteroatoms or heterogroups such as, for example, halogens, preferably chlorine or fluorine, weakly co-ordinating O, N, P or S atoms such as, for example, in case of electronically poor compounds such as pentafluoroanisol or in sterically hindered ethers, carbonates or amines such as 2,6-di-t-butylaniline, 2,2,5,5-tetramethyltetrahydrofuran or 2,5-di-t-butylfuran.

Component (B) of the present invention preferably consists of a monomeric compound having from 1 to 30 carbon atoms, or a mixture of these compounds, although polymeric compounds also having more than 30 carbon atoms are not excluded from the scope of the present invention.

Preferred components (B) are organic compounds containing at least one heteroatom selected from O, N, P or S which have a co-ordinating capacity DN of less than 5 kcal/mole. Particularly preferred (B) components are the organic compound containing O, N, P or S atom(s) bonded to at least one fluorinated carbon atom or to a fluorinated aromatic ring. Also preferred are fluorinated heteroaromatic compounds.

Typical but non-limiting examples of compounds which can be used as component (B) in the present invention are:

halogenated ethers such as 3-perfluorohexyl-1,2-epoxypropane, 3-(2,2,3,3-tetrafluoropropoxy)-1,2-epoxypropane, 2-trifluoromethyltetrahydrofuran, 2-trichloromethyltetrahydrofuran, 1,1,2,2-tetrafluoronmethylether, 1,1,2-trifluoro-2-chloroethyl-2,2,2-trifluoroethylether, 2,2,2-trifluoroethylethylether, 2,2,2-trifluoroethyltriethylether, 2,5-difluorotetrahydrofuran, 2,2,2-trifluoroethyltrimethylsilylether, 2,2,2-trifluoroethyltriphenylsilylether, 2-methoxy-1,1,1-trifluoropropane, 2,2,2-trifluoroethoxycyclohexane, pentafluoroanisole, 2-trifluoromethyltetrahydropyrane;

halogenated weak amines such as pentafluoropyridine, perfluoro-N-methyimorpholine, N-trifluoromethylpyrrole;

sterically hindered and/or electronically stabilized amines or ethers such as 2,6-di-t-butylpyridine, 1,3-dimethoxybenzene, 2,2,5,5-tetramethyltetrahydrofuran, 2,5-di-t-butyltetrahydrofuran.

The moles of component (B) in the catalyst of the present invention are normally in excess with respect to the gram-atom weight of the transitions metal or lanthanide of the metallocene derivative. The ratio between the moles of (B) and the moles of the metallocene is preferably between 2 and 10,000, more preferably between 20 and 500.

The catalyst of the present invention can be prepared by simply putting the two components (A) and (B) in contact in the desired proportions. The temperature is not generally critical, within the limits in which the two components have sufficient stability. The contact preferably takes place at temperatures of between room temperature and the polymerization temperature.

The contact between (A) and (B) is preferably carried out in an inert liquid medium in which at least component (B) is soluble. This liquid medium can be the same polymerization solvent, if used, or also a monomer to be polymerized. Preferred liquid mediums are the hydrocarbon solvents normally used in the polymerization of olefins such as, for example, hexane, heptane, toluene, etc.

Components (A) and (B) are preferably put in contact with each other at the beginning of the polymerization, for a time at least equal to the minimum period necessary to complete the desired activation of component (A). This period is normally between 20 seconds and 15 minutes, depending on the respective nature of the two components.

The contact between the two components (A) and (B) can obviously be prolonged beyond this period without any inconvenience, and therefore the catalyst of the present invention can be transported or stored until the moment of use without any particular drawback, provided the precautions and regulations normally required for a satisfactory conservation of component (A) alone, are observed.

Besides components (A) and (B), the catalyst of the present invention can comprise, if necessary or desirable, all the other known components which are normally considered appropriate in a process for the polymerization of alpha-olefins wherein the component (A) as such is used as catalyst.

The catalysts of the present invention can be used in the (co)polymerization of olefins to give linear polymers having different characteristics as a function of the olefin(s) which is (co)polymerized and the process conditions. Alpha-olefins which can be polymerized with the catalysts of the present invention preferably contain from 2 to 20 carbon atoms and can also comprise heteroatoms. The present catalyst can preferably be used in homo- and co-polymerization processes of 1-alkenes such as ethylene, propylene, 1-butene, 4-methylpentene, 1-octene, 1-decene, styrene, etc., to give amorphous or crystalline polymers with a high molecular weight or also of a lower molecular weight, when desired, the polymerization being carried out under suitable conditions for the purpose, normally known in the art.

The catalysts of the present invention can be used with excellent results in the polymerization of ethylene to give linear polyethylene and in the copolymerization of ethylene with propylene or higher alpha-olefins to give copolymers having different characteristics depending on the specific polymerization conditions and the quantity and structure of the alpha-olefin itself used as comonomer. The catalyst of the present invention can also be conveniently used for the terpolymerization of ethylene, propylene and a diene to obtain vulcanizable rubbers of the EPDM type.

When the component (A) is suitably structured for the aim, the present catalysts can also be advantageously used for the stereoselective polymerization of alpha-olefins, preferably containing from 3 to 20 carbon atoms, to obtain iso- or syndiotactic polyolefins with a high stereospecificity. The iso- or syndio-tactic orientation essentially depends on the structure of the alpha-olefin which is polymerized. For example, isotactic polymers of propylene (isotactic polypropylene) and 1-butene (isotactic poly-l-butene) and syndiotactic polymers of styrene and its homologous substitutes, are obtained.

The catalysts of the present invention can be used with excellent results in essentially all known polymerization processes of alpha-olefins, and particularly in processes in suspension, at low, medium or high pressure and at temperatures of between 50 and 240° C., or in processes in solution in an inert diluent operating normally at pressures of between 10 and 150 bars and temperatures of between 50 and 230° C. Hydrogen is usually used as molecular weight regulator. Preferably the catalyst of the present invention is used in polymerization processes at temperatures comprised between 50 an 140 ° C.

In all cases, the catalysts of the present invention are characterized by a notable increase in activity with respect to that which can obtained with component (A) alone, without the addition of the weak coordinating polar compound (B). Increases in productivity even up to fifteen times greater than that of component (A) alone under the same conditions are surprisingly obtained with the improved catalysts of the present invention. Although not being bound to any particular theory, it is believed that the higher activity with respect to component (A) alone may derive both form an activating and stabilizing effect of component (B).

According to a particular aspect of the present invention, the improved catalyst for the (co)polymerization of alpha-olefins is prepared separately in accordance with one of the methods mentioned above, and subsequently introduced into the polymerization environment. The catalyst can be charged first into the polymerization reactor followed by the reagent mixture containing the alpha-olefin and possible comonomers, or the catalyst can be charged in the reactor already containing the reagent mixture, or, finally, the reagent mixture and the catalyst can be fed contemporaneously into a continuous reactor.

According to another aspect of the present invention, the catalyst is formed in situ in the polymerization reactor, for example by charging components (A) and (B) separately from each other in the appropriate proportions and possibly in the presence of an inert solvent.

According to the present invention, component (B) can also be fed to the reactor mixed with the stream containing the monomer, component (A) being fed separately.

The present invention is further described by the following examples which however are purely illustrative and do not limit the overall scope of the invention itself.

EXAMPLE 1

A solution of a catalyst of the present invention is prepared as follows:

0.46 ml of a 1.8 M solution of aluminium ethyldichloride in toluene (AlEtCl$_2$, 0.8 mmoles, commercial product ALDRICH) are added to a solution obtained by dissolving 25.8 mg of bis($\eta^5$-cyclopentadienyl)titanium dichloride (commercial product ALDRICH, 0.1 mmoles), purified by sublimation, in 15 ml of anhydrous toluene, and the mixture is left under stirring for 10 minutes at room temperature; a solution is obtained which is initially orange and subsequently darkens to brownish colour (component A).

0.6 ml of pentafluoroanisol (PFA, commercial product ALDRICH, 25 mmoles, component B) previously distilled on calcium hydride are then added and the mixture is left under stirring for a further 10 minutes at room temperature; an olive-green solution of the desired catalyst is obtained (molar ratios Al/Ti/PFA=8/1/40), which is maintained under an inert atmosphere.

100 ml of toluene are charged into a 250 ml tailed test-tube in a nitrogen atmosphere, previously degenerated by vacuum/nitrogen repeated three times. The nitrogen is then substituted with ethylene (purity 99.95%), carrying out three washings with this and ethylene pressure is left at 101 kPa (1 atm).

4.9 ml (0.032 mmoles of Ti) of the catalyst solution prepared as above are then charged into the test-tube. The polymerization reaction is almost immediately activated. The polymerization is carried out for 10 minutes, continuously feeding ethylene to maintain the pressure constant at 101 kPa. The polymer is recovered by precipitation in acidified methanol and subsequent washings with acetone. After drying in a stream of air at room temperature for 24 hours, 0.44 g of polyethylene are obtained, with a catalytic activity of 86 $g_{PE}/(mmole_{Zr} \cdot 100 \ kPa_{(ethylene)} \cdot h)$.

EXAMPLE 2

Comparative

A solution of a catalyst of the known art is prepared analogously to example 1 above, but without adding PFA. 23.9 mg of bis($\eta^5$-cyclopentadienyl)titanium dichloride, 15 ml of toluene and 0.42 ml of the toluene solution of AlEtCl$_2$ are used (molar ratios Al/Ti/PFA=8/1/250). A polymerization test of ethylene is then carried out using this catalyst (5.3 ml of solution, 0.032 mmoles of Ti), operating as in example 1 above. At the end 0.038 g of polyethylene are obtained, with a catalytic activity of 7 $g_{PE}/(mmole_{Zr} \cdot 100 \ kPa_{(ethylene)} \cdot h)$.

EXAMPLE 3

A solution of a catalyst of the present invention is prepared as follows.

0.72 ml of a 10% solution by volume of aluminium triethyl in toluene (AlEt$_3$, 0.516 mmoles, commercial product ALDRICH) are added to a suspension of 21.6 mg of ethylene-bis-($\eta^5$-indenyl)zirconium dichloride (commercial product WITCO, 0.052 mmoles) in 20 ml of anhydrous toluene; a yellow suspension is obtained which subsequently becomes lighter.

8.6 ml of a toluene solution containing 26.4 mg of tris-(pentafluorophenyl)boron (0.052 mmoles) are then added to the same suspension, and a limpid green solution is rapidly obtained (component A).

1.75 ml of PFA (12.5 mmoles, component B), previously distilled on calcium hydride, are then added to the green solution and the mixture is left under stirring for a further 10 minutes at room temperature, a pink-coloured solution of the desired catalyst is obtained (molar ratios Al/Zr/PFA=10/1/240), which is maintained under an inert atmosphere.

A BUCHI autoclave with a one litre glass reactor, equipped with a propeller stirrer, thermocouple and thermostatic jacket, is preliminarily maintained under vacuum for two hours and subsequently filled with nitrogen. The same operation of vacuum/nitrogen is repeated twice. 500 ml of anhydrous toluene (distilled on metallic sodium) are then introduced and ethylene is pumped in up to a pressure of 202 kPa (2 atm). The temperature is brought to 70° C. The autoclave is depressurized and 15.1 ml of the catalyst solution prepared as above are charged, under ethylene flow (0.024 mmole of Zr). The pressure is brought again to 202 kPa, with the immediate start of the polymerization reaction which is carried out for 10 minutes maintaining the autoclave at 70° C. under stirring, and continuously feeding ethylene to maintain the pressure constant at the initial preset value. At the end of the reaction, the polymer is recovered by precipitation with acidified methanol and subsequent washings with acetone.

After drying at room temperature in a stream of air, 6.7 g of polyethylene are obtained with a catalytic activity of 838 $g_{PE}/(mmole_{Zr} \cdot 100 \ kPa_{(ethylene)} \cdot h)$

EXAMPLE 4

Comparative

The procedures for the preparation of the catalyst and the polymerization as described in example 3 above are repeated exactly, with the only difference that PFA is not added to the component (A) solution.

At the end of the polymerization and after drying, 1.0 g of polyethylene are recovered, with a catalytic activity of 125 $g_{PE}/(mmole_{Zr} \cdot 100 \ kPa_{(ethylene)} \cdot h)$

EXAMPLES FROM 5 TO 12

Eight catalysts are prepared and tested in a polymerization process according to the same procedures as described in example 3 above, with the only difference that a component (B) different from PFA is added to the component (A) solution, according to the compounds and amounts reported for each example from 5 to 9 in the following Table 2.

At the end of each polymerization test, the polymer is recovered and treated exactly as described in example 3 The results are summarized in Table 2.

TABLE 2 ethylene polymerization

| Example | Component (B) | Amount of (B) (mmoles) | Yield PE (g) | Activity [$g_{PE}$/(mmole$_{Zr}$·100 kPa$_{(ethylene)}$·h)] |
|---|---|---|---|---|
| 3 | 1,2,3,4,5-pentafluoro-anisol (PFA) | 12.5 | 6.7 | 838 |
| 4* | None | 0.0 | 1.0 | 125 |
| 5 | trifluoromethyl-phenylether | 12.5 | 1.3 | 158 |
| 6 | 2,2,5,5-tetramethyl-tetrahydrofurane | 12.5 | 1.7 | 207 |
| 7 | 1,3-dimethoxybenzene | 12.5 | 2.0 | 244 |
| 8 | 4-fluoroanisol | 26.0 | 3.0 | 366 |
| 9 | Pentafluoropyridin | 12.5 | 3.8 | 463 |
| 10* | Diisobutylphthalate | 12.5 | 0.0 | 0 |
| 11* | Diisobutylphthalate | 2.6 | 0.0 | 0 |
| 12* | Tetrahydrofurane | 12.5 | 0.0 | 0 |

*Comparative Example

EXAMPLE 13

A 1 liter autoclave, prepared and equipped as previously described in example 3, is filled with 470 ml of anhydrous toluene (distilled on metallic sodium) 30 ml anhydrous 1-hexene. Ethylene is then introduced up to a pressure of 202 kPa (2 atm). The temperature is brought to 40° C. The autoclave is depressurized and 15.0 ml of the catalyst solution prepared according to previous example 3 are charged (0.023 mmole Zr), under ethylene flow. The pressure is brought again to 202 kPa, with the immediate start of the polymerization reaction which is carried out for 10 minutes maintaining the autoclave at 40° C. under stirring, and continuously feeding ethylene to maintain the pressure constant at the initial preset value. At the end of the reaction, the polymer is recovered by precipitation with acidified methanol and subsequent washings with acetone.

After drying at room temperature in a stream of air, 1.2 g of ethylene/1-hexene copolymer are obtained with a catalytic activity of 155 $g_{COP}$/(mmole$_{Zr}$·100 kPa$_{(ethylene)}$·h). The copolymer has a content of 1-hexene derived monomeric units of 4.2 mol %, as determined by $^1$H-NMR spectroscopy.

EXAMPLE 14

Comparative

The polymerization procedure according to example 13 above, is repeated exactly, with the only difference that PFA is not added to the component (A) solution in the preparation of the catalyst according to example 3.

At the end of the polymerization and after precipitation with acidified methanol, traces of solid appeared, which gave few milligram of uncharacterized product after separation and drying. Thus, the ionic catalyst obtained according to example 3 resulted to be unactive in the copolymerization of ethylene in the above-specified conditions, in the absence of an activator according to the present invention.

EXAMPLE 15

A solution of a catalyst of the present invention is prepared as follows.

0.60 ml of aluminium triethyl (AlEt$_3$, 4.01 mmoles) are added to a solution of 11.7 mg of ethylene-bis-($\eta^5$-cyclopentadienyl)zirconium dichloride (commercial product FLUKA, 0.04 mmoles) in 5 ml of anhydrous toluene; a pale yellow solution is obtained.

3.88 ml of a toluene solution containing 37 mg of triphenylcarbenium tetrakis-(pentafluorophenyl)borate (0.04 mmoles) are then added to the same solution, and a limpid red solution is rapidly obtained (component A).

1.36 ml of PFA (9.6 mmoles, component B), previously distilled on calcium hydride, are then added to the red solution and the mixture is left under stirring for a further 10 minutes at room temperature and brought to 50 ml total volume with anhydrous toluene. The red-coloured solution of the desired catalyst thus obtained (molar ratios Al/Zr/B/PFA=100/1/1/240, [Zr]=0.8 mmole/L) is maintained under an inert atmosphere.

A polymerization reaction is carried out according to the procedure of example 3, but with the following differences. 0.38 ml of a 10% toluene solution of triethylaluminum (0.2 mmoles) are first dropped in and mixed with the 500 ml toluene in the autoclave; then 0.63 ml (5·10$^{-4}$ mmole of Zr) of the catalyst solution prepared as above are charged under ethylene flow. The polymerization reaction is carried out for 30 minutes maintaining the autoclave at 70° C. under stirring.

After drying at room temperature in a stream of air, 7.1 g of polyethylene are obtained with a catalytic activity of 14210 $g_{PE}$/(mmole$_{Zr}$·100 kPa$_{(ethylene)}$·h).

EXAMPLE 16

Comparative

The procedures for the preparation of the catalyst and the polymerization as described in example 15 above are repeated exactly, with the only difference that PFA is not added to the component (A) solution during the preparation of the catalyst.

At the end of the polymerization and after precipitation with acidified methanol and drying of the recovered solid, 3.7 g of polyethylene were obtained, with a catalytic activity of 7400 $g_{PE}$/(mmole$_{Zr}$·100 kPa$_{(ethylene)}$·h).

EXAMPLES 17 and 18

Comparative

The procedures for the preparation of the catalyst and the polymerization as described in example 15 above are repeated exactly, with the only difference that PFA is replaced by 9.6 moles of diisobutylphthalate (2.5 ml, Al/Zr/B/DIBF=100/1/1/240) during the preparation of the catalyst.

At the end of the polymerization and after addition of acidified methanol, no precipitation of polymer was detected.

The same negative result is obtained when 2.0 mmoles of diisobutylphthalate are used (0.53 ml, Al/Zr/B/DiBF=100/1/1/50)

What is claimed is:

1. A process for the (co)polymerization of alpha-olefins, in the absence of organo-oxygenated compounds of metals of groups 13 or 14 of the Periodic Table of Elements, comprising feeding said alpha-olefin and optional co-monomers to a continuous or batch reactor, and (co)polymerizing the mixture in suspension or solution in a suitable liquid medium in the presence of a polymerization process wherein said process comprises the following components in contact with each other:
(A) an ionic metallocene compound of a metal selected from the group consisting of titanium, zirconium and hafnium, wherein said compound has a cation and an anion, and wherein said metal is included in the cation, and wherein said compound has the property itself of promoting the polymerization of olefins without organo-oxygenated compounds of metals of groups 13 or 14 of the periodic table of elements,
(B) a substance not containing metal atoms, and containing at least one heteroatom selected from the group consisting of O, N, P and S, characterized in that this substance (B) consists of an aprotic polar compound having a dielectric constant greater than or equal to 3 and co-ordinating capacity DN less than or equal to 10 kcal/mole.

2. The process according to claim 1, wherein said metallocene compound is obtained starting from a metallocene having the following formula (II):

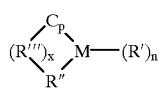

(II)

wherein:
M represents a metal selected from the group consisting of titanium, zirconium and hafnium; $C_p$ is an anion containing a $\eta^5$-cyclopentadienyl ring co-ordinated to the metal M;
each of R' independently represent a substituted group selected from the group consisting of hydride, halide, a $C_1$–$C_8$-alkyl group, a $C_3$–$C_{12}$ alkylsilyl group, a $C_5$–$C_8$-cycloalkyl group, a $C_6$–$C_{10}$ aryl group, a $C_1$–$C_8$ alkoxyl group, a $C_1$–$C_8$ carboxyl group, a $C_2$–$C_{10}$ dialkylamide group and a $C_4$–$C_{20}$ alkylsilylamide group;
R" represents a monovalent or divalent group when "x" is 0 or 1, respectively, independently selected from the group consisting of R' and a second anion containing an $\eta^5$-cyclopentadienyl ring coordinated to the metal M, when "x" is 0, or independently selected from said group but having a position substituted by a bond for bridging with R'", when "x" is 1;
R'" represents a divalent group having from 1 to 10 carbon atoms, optionally containing one or more heteroatoms, which is bridge-linked between $C_p$ and R" with a covalent bond;
"in" is an integer and is equal to the valence of M less 2;
"x" is 0 or 1;
  i) by reaction of said metallocene with an alkylating agent in a molar excess of 5–50/1, followed by reaction, in an almost stoichiometric ratio with the metal M, with a strong Lewis acid or with an ionic compound whose cation has the property of extracting one of the groups R' or R" and forming a neutral compound, and whose cation is non-coordinating; or
  ii) by reaction with a strong Lewis acid or with an ionic compound according to step i), with the proviso that at least one R' or R" group of the metallocene having the above formula (II), is alkyl or alkylene.

3. The process according to claim 2, wherein, in formula (II), "x" is 1, R'" is selected from the group consisting of alkylene, dialkylsilylene, dialkylsilylene, diarylsilylene, arylene and arylene-bis-alkylene and R" is a second anion containing a $\eta^5$-cyclopentadienyl ring co-ordinated to the metal M.

4. The process according to claim 2, wherein, in formula (II), "x" is 0, and R" is a second anion containing a $\eta^5$-cyclopentadienyl ring co-ordinated to the metal M.

5. The process according to claim 1, wherein the polymerization reaction is carried out at a temperature from 50 to 140° C.

6. The process according to claim 1, wherein said alpha-olefin is ethylene.

7. The process according to claim 1, wherein said metallocene compound in component (A) is in solution or in suspension in an inert liquid medium.

8. The process according to claim 1, wherein said metallocene compound in component (A) is supported on an inert solid medium.

9. The process according to claim 1, wherein said process is formed in situ in the polymerization reactor by contact of said components (A) and (B).

10. The process according to claim 1, wherein said component (B) consists of a compound having a co-ordinating capacity DN less than or equal to 5.0 kcal/mole.

11. The process according to claim 1, wherein said component (B) consists of an organic compound containing at least one heteroatom selected from the group consisting of O, N, P and S, and which has a co-ordinating capacity DN less than 5 kcal/mole.

12. The process according to claim 11, wherein said component (B) consists of an organic compound containing O, N, P or S atom(s) bonded to at least one fluorinated carbon atom or to a fluorinated aromatic ring.

13. The process according to claim 11, wherein said component (B) is a fluorinated heteroaromatic compound.

14. The process according to claim 12, wherein said component (B) consists of pentafluoroanisole.

15. The process according to claim 1, wherein the ratio between the moles of said substance of component (B) and the gram-atom weight of the transition metal or lanthanide in component (A) is between 2 and 10,000.

16. The process according to claim 9, wherein said component (B) is fed to the reactor mixed with the alpha-olefin.

17. The process according to claim 2, wherein R'" contains one or more heteroatoms selected from the group consisting of O, N, P and Si.

18. The process according to claim 2 wherein R'" is selected from the group consisting of alkylene, dialkylsilylene, diarylsilylene, alkyl- or arylamino or phosphino radicals, arylene, and arylene-bis-alkylene.

19. The process according to claim 7, wherein the inert liquid medium is nonapolar.

20. The process according to claim 8, wherein the inert solid medium is an inert inorganic oxide.

21. The process according to claim 20, wherein the inert inorganic oxide is selected from the group consisting of alumina, silica and silicoaluminates.

22. The process according to claim 15, wherein the ratio is between 20 and 500.

* * * * *